(12) United States Patent
Bronersky

(10) Patent No.: US 11,479,942 B2
(45) Date of Patent: Oct. 25, 2022

(54) HYDRO EXCAVATION REMOTE DIG SYSTEM

(71) Applicant: Bart Bronersky, Clayton, DE (US)

(72) Inventor: Bart Bronersky, Clayton, DE (US)

( * ) Notice: Subject to any disclaimer, the term of this patent is extended or adjusted under 35 U.S.C. 154(b) by 0 days.

(21) Appl. No.: 16/921,668

(22) Filed: Jul. 6, 2020

(65) Prior Publication Data

US 2020/0332494 A1 Oct. 22, 2020

Related U.S. Application Data

(63) Continuation-in-part of application No. 15/838,200, filed on Dec. 11, 2017, now abandoned.

(51) Int. Cl.
| | | |
|---|---|---|
| *E02F 3/92* | (2006.01) | |
| *E02F 3/88* | (2006.01) | |
| *E02F 3/90* | (2006.01) | |
| *F16K 1/22* | (2006.01) | |
| *A47L 9/24* | (2006.01) | |
| *F16K 51/02* | (2006.01) | |
| *E02F 3/94* | (2006.01) | |

(52) U.S. Cl.
CPC ............ *E02F 3/9293* (2013.01); *A47L 9/248* (2013.01); *E02F 3/8816* (2013.01); *E02F 3/905* (2013.01); *F16K 1/223* (2013.01); *E02F 3/94* (2013.01); *F16K 51/02* (2013.01)

(58) Field of Classification Search
CPC ....... E02F 3/9293; E02F 3/8816; E02F 3/905; E02F 3/90; E02F 3/94; E02F 7/10; A47L 9/248; F16K 1/223
USPC ........................................................ 15/415.1
See application file for complete search history.

(56) References Cited

U.S. PATENT DOCUMENTS 6,751,893 B2 * 6/2004 Sullivan .................. E02F 3/925
 37/195
7,837,050 B2 * 11/2010 Maybury, Jr. ......... E02F 3/8891
 220/211

* cited by examiner

*Primary Examiner* — Katina N. Henson
(74) *Attorney, Agent, or Firm* — Steven R. Fairchild

(57) ABSTRACT

The hydro excavation remote dig system provides for a primary and secondary dig tube attachments that permit a vacuum truck to be used for a remote dig setup. Specifically, the attachments include various attachable handles, corrugated tubing that connects to a reinforcement bar device with releasable clamps to maintain the corrugated tubing in an elongated state during use, a debris box with an integrated safety valve, and a dig tip.

8 Claims, 20 Drawing Sheets

4A

4D

4B

4E

4C

4F

HYDRO EXCAVATION REMOTE DIG SYSTEM

CROSS-REFERENCE TO RELATED APPLICATION(S)

This application is a continuation-in-part of U.S. patent application Ser. No. 15/838,200, filed on Dec. 11, 2017.

BACKGROUND OF THE INVENTION

1. Field of Invention

The present invention relates to the field of dig tube attachments for vacuum trucks.

2. Description of Related Art

Various vacuum units and systems have been developed and used for picking up various types of material. In specific applications, for example, vacuum units have been used for excavation, for example, where removal of the excavated material was difficult to accomplish by other methods or where the excavation had to take place where damage to equipment, such as buried equipment, was a significant risk if alternative methods of excavation were used. Further, relatively large vacuum units have been mounted on a truck, and vacuum trucks have been driven to sites where excavation has been needed or where material needed to be picked up. For example, vacuum trucks have been used to excavate around buried utilities such as pipelines buried in the ground, where shutting down the pipeline would be a significant detriment, where excavation with other means, such as a back hoe, would have a greater risk of damaging the buried utility or pipeline, impose a safety risk to workers, or a combination thereof.

Still further, water has been used to break up material (e.g., earth) at an excavation site where the material is being picked up by a vacuum unit or system. Water systems have been mounted on vacuum trucks for this purpose, and have included, among other things, a water tank, water pump, water conduit that extends to the excavation site, and a water nozzle that is hand guided at the excavation site by an operator. Vacuum trucks with water systems have been referred to as hydrovac trucks, for example. Even further, air has been used to excavate material as a replacement for excavation water. Further still, excavation systems that used water often resulted in the material becoming overly wet (e.g., mud) which has made the material poorly suited to use immediately to backfill the excavation site when the work that required the excavation was completed. On the other hand, excavation systems that used air often created excessive dust and were not as effective as water at excavating certain types of material. Needs and potential for benefit or improvement exist for vacuum units and vacuum trucks that overcome these and other deficiencies of the prior art.

Current attempts have been made to address the needs of vacuum truck operators.

U.S. Pat. No. 4,140,422 to Crumpler describes a plastic corrugated drainage pipe comprising a handle and a flexible conduit. The handle has a connector at its one end and is removably connected with a water supply pipe by the connector.

U.S. Pat. No. 5,425,188 to Rinker describes an excavator for suction material, particularly for removing soil from underground pipes. The excavator has a pneumatic elephant trunk for removing the suctioned material and which issues into a storage tank for the suctioned material and to which is connected an exhaust fan.

U.S. Pat. No. 5,564,472 to Gipperich describes a reinforced flexible corrugated tubing comprising a plurality of corrugations and connecting members.

U.S. Pat. No. 6,112,439 describes a suction dredge for the planned taking up of suction material, particularly for excavating soil from underground pipes, has a pneumatic suction hose for taking up the suction material and at whose lower end is provided a suction stub. At its opposite, upper end the suction hose issues into a collecting tank. To simplify the handling of the suction stub, it is provided with a guide body fitted to the suction hose and a suction nozzle axially movable relative thereto and which by means of a drive mechanism can be retracted into and extended from the guide body.

U.S. Pat. No. 6,672,626 to Schafer describes a corrugated pipe connection stabilizing apparatus for stabilizing a joint between two sections of corrugated pipe. A first section of corrugated pipe is associated with a second section to form a joint.

EP20070107541 to Baumann describes a suction device for a handheld electrical tool and handheld electrical tool with suction device U.S. Pat. No. 8,858,124 to Lamonte describes an excavation system which utilizes a vacuum truck having a vacuum system in combination with a small backhoe to which an excavator assembly is affixed to the backhoe extendable and articulating arm whereby manipulation of the excavator assembly can be controlled by an operator positioned in the backhoe operator cab.

PCT/NO2004/000255 to Jacobsen describes a subsea excavation and suction device comprising a suction head with an inlet opening at an outer, free end and an outlet opening connected to a suction hose arranged at a distance from the inlet opening. The suction head is mounted on a hydraulic controller arm and has at the inlet opening provided with mechanic and hydraulic means to disintegrate solid material (sediment).

The foregoing prior art does not describe the present invention.

The current invention provides numerous advantages over the prior art. This includes: (1) A reinforcement bar device with releasable clamps which maintains the corrugated tubing in elongated state during use to prevent the accordion effect; (2) A dig tip rock guard which prevents large rocks from being sucked up into the corrugated tubing; (3) A debris box with a safety valve which collects debris and prevents debris from entering the vacuum truck; and, (4) various attachable handles permit secure handling of dig tube attachment during use.

The current invention fundamentally involves a dig tube attachment that permits a vacuum truck to be used for a remote dig setup. Specifically, the attachment includes various attachable handles, corrugated tubing that connects to a reinforcement bar device with releasable clamps to maintain the corrugated tubing in an elongated state during use, a debris box with an integrated safety valve, and a dig tip.

SUMMARY OF THE INVENTION

A primary attachment at the distal end of a vacuum truck hose, consisting of
 a. at least one handle,
 b. a shutter relief valve,
 c. a clamp, d. at least one assembly bar, and e. a vacuum tip.

A secondary attachment along the length of the vacuum truck hose, consisting of a. a debris box door b. a safety handle c. a grate, and d. at least one bar hook.

The foregoing, and other features and advantages of the invention, will be apparent from the following, more particular description of the preferred embodiments of the invention, the accompanying drawings, and the claims.

BRIEF DESCRIPTION OF THE DRAWINGS

For a more complete understanding of the present invention, the objects and advantages thereof, reference is now made to the ensuing descriptions taken in connection with the accompanying drawings briefly described as follows.

DETAILED DESCRIPTION OF PREFERRED EMBODIMENTS

Figure 1:
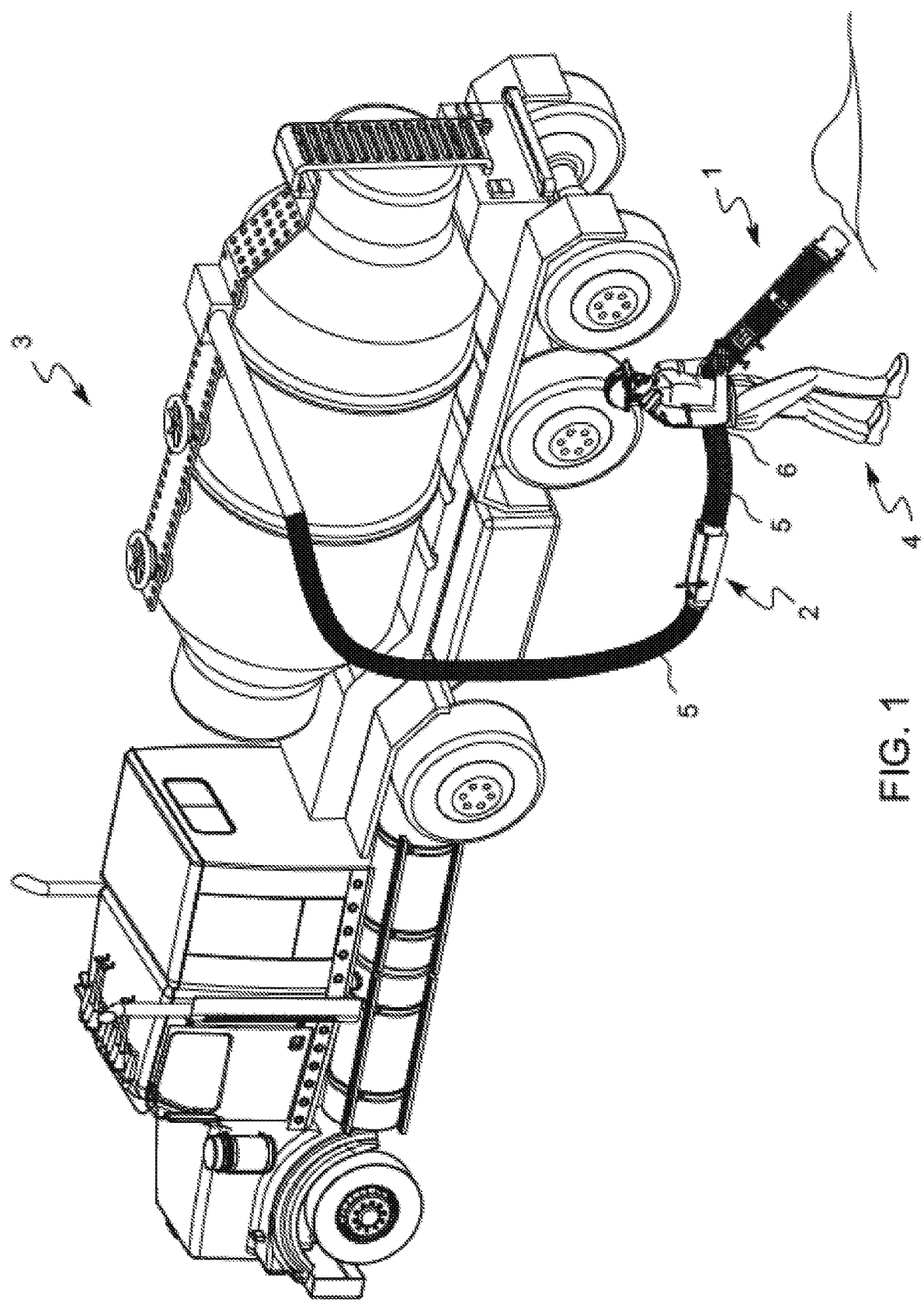
FIG. 1 is a general overview of the interaction of the invention with a vacuum truck, according to an embodiment of the present invention.

Preferred embodiments of the present invention and their advantages may be understood by referring to FIGS. 1-15, wherein like reference numerals refer to like elements.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are numerous modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

Reference is made to the figures of the invention included herein. A detailed description of the figures follows below.

Vacuum Truck

It is envisioned that the invention can articulate with any standard industry vacuum truck used by people of ordinary skill in the art to suction a liquid into the vacuum truck. The vacuum truck provides a pressurize liquid flow through the corrugated hoses or tubes. When articulated with the invention, this vacuum pressure suctions the liquid flow through the invention from the distal end of the primary attachment to its proximal end. In a preferred embodiment, the pressurized liquid flow would then also travel through the secondary attachment. It is also envisioned that the vacuum pressure of the invention will withstand the typical vacuum pressure utilized by people of ordinary skill in the art.

FIG. 1 is a general overview of the interaction between the primary attachment (1), a secondary attachment (i.e., debris box (2), and a vacuum truck (3), according to an embodiment of the present invention.

It is envisioned that the invention can articulate with any standard industry vacuum hose (5) commonly used with vacuum trucks. Such vacuum hoses vary by manufacturer but are typically corrugated tubing or pipe. They generally have an internal lumen diameter of between 6-8 inches while their outside structural diameters are generally 7-9½ inches wide.

It is envisioned that the secondary attachment (i.e., debris box) (2) would articulate with the vacuum hose at point proximal from the primary attachment (1) along the length of the vacuum hose and closer to the vacuum truck (3).

As a vacuum truck operator (4) would realize, the primary attachment articulates at the distal end of a vacuum hose (6).

Primary Attachment, as Assembled

Figure 2:
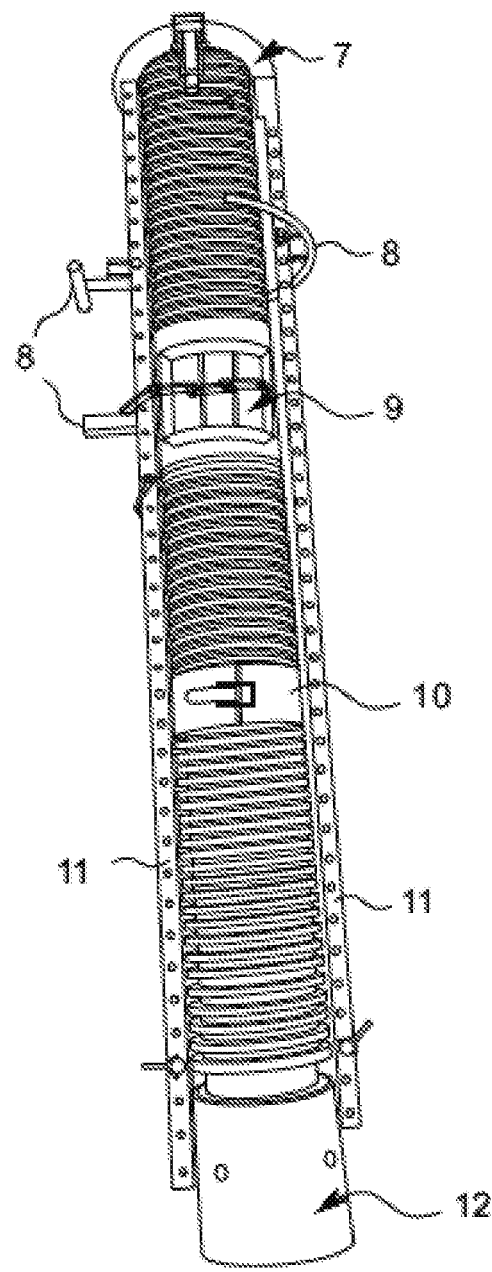
FIG. 2 is an overview of the primary attachment as assembled, according to an embodiment of the present invention.

FIG. 2 is an overview of the assembled primary attachment according to an embodiment of the present invention. This includes the adaptor (7) (also shown in detail in FIG. 3), three examples of handles (8) (also shown in FIG. 4), the shutter relief valve (9) (also shown in FIG. 5A and FIG. 5B), the clamp (10) (also shown in FIG. 6), assembly bars (11) (also shown in FIGS. 9A and 9B), and the vacuum tip (12) (also shown in FIG. 7).

In a preferred embodiment, the primary attachment attaches to flexible, ridged tubing commonly used in vacuum excavation dig systems. Specifically, the adaptor connects with the distal end of the flexible tubing.

In a preferred embodiment, the handles are removable and can be moved up and down the device through the use of pins.

In a preferred embodiment of the invention, the adaptor of the primary attachment connects directly to ribbed flexible tubing or pipe.

In a preferred embodiment, the secondary attachment (i.e., debris box) (2) (also shown in FIG. 8) connects with flexible tubing proximal to the adaptor as depicted in FIG. 1.

In a preferred embodiment of the invention, the internal lumen of the primary attachment is about 6-8 inches while the diameter of the outside structure is about 7-9½ inches. In a preferred embodiment of the invention, the internal lumen of the primary attachment is about 6 inches while the diameter of the outside structure is about 7 inches.

Figure 6:
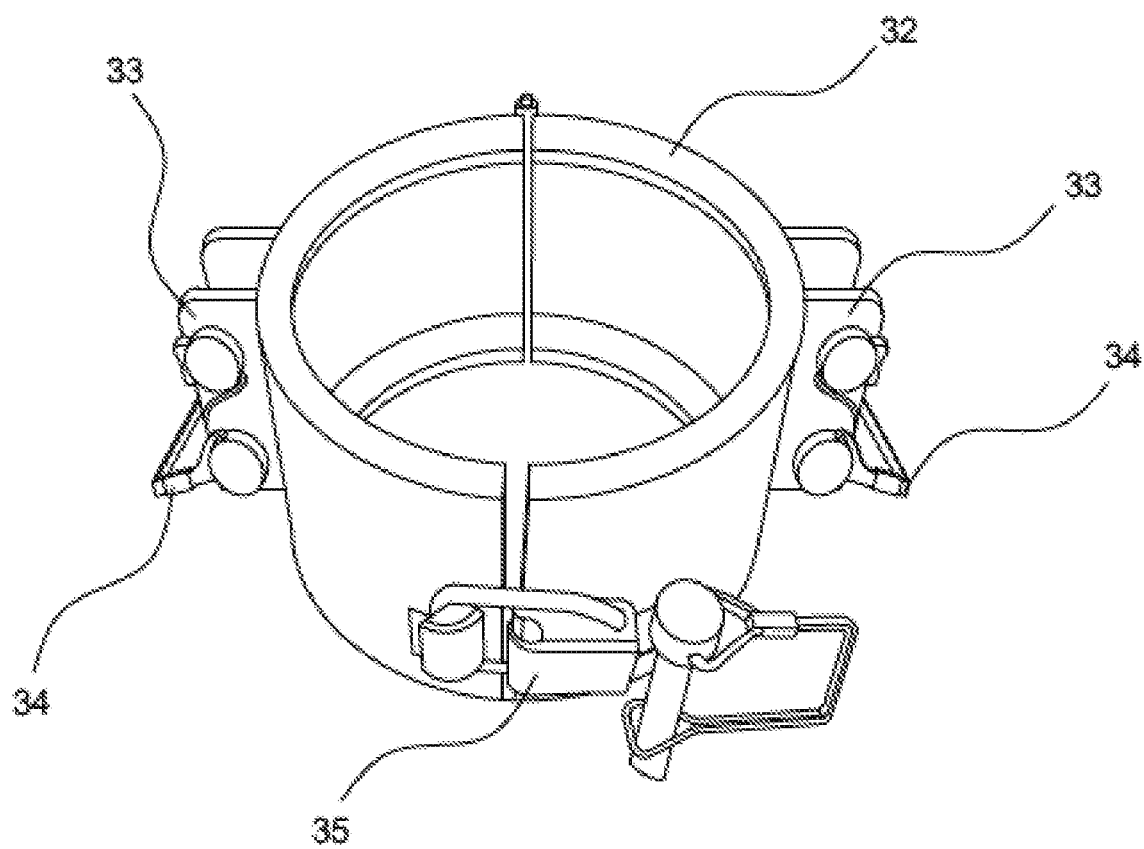
FIG. 6 is a view of the clamp, according to an embodiment of the present invention.

In a preferred embodiment, the clamps (10) can be moved up and down the device along the bar (11) by pinning it to the bar using the pins (34) shown in FIG. 6. The body of the clamp (32) locks into the ridges of the bar (11).

Assembly Bars

The invention employs a series of lengthwise bars to hold all the components of the primary attachment in place. The lengthwise bars not only enable stability of the primary attachment, but provide places for the operator to hold the primary attachment.

These bars also assist in maintaining the rigidity in the flexible tubes, otherwise at vacuum pressure, the flexible tubing would compress together, much the way an accordion does under compression.

Figure 9A:
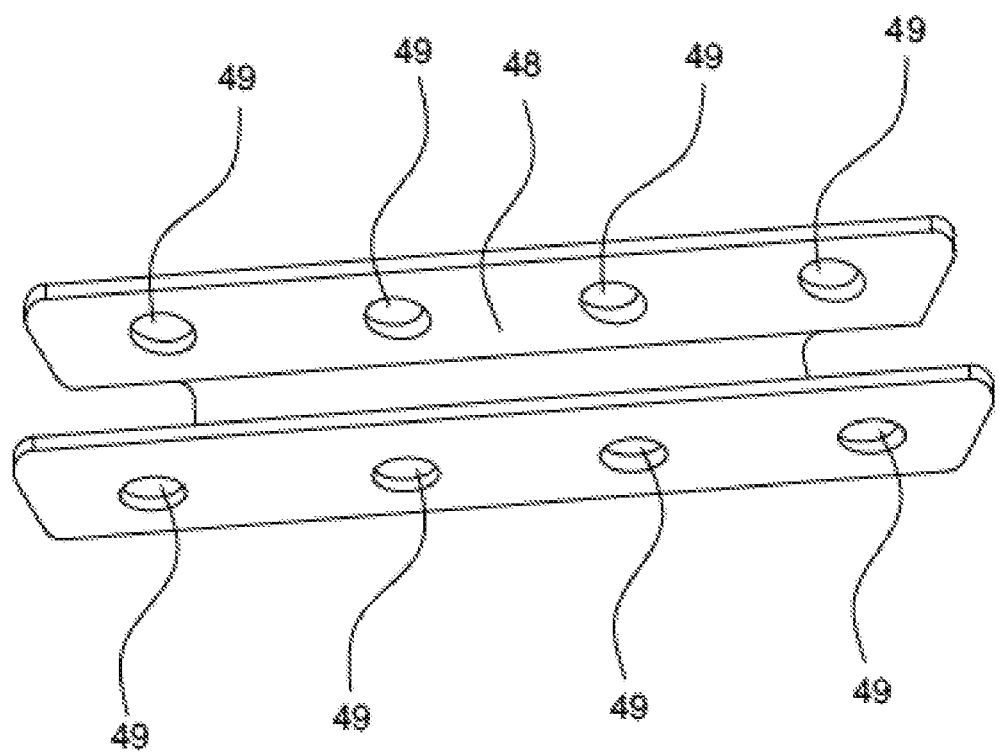
FIG. 9A is a view of the assembly bar short segment, according to an embodiment of the present invention.
Figure 9B:
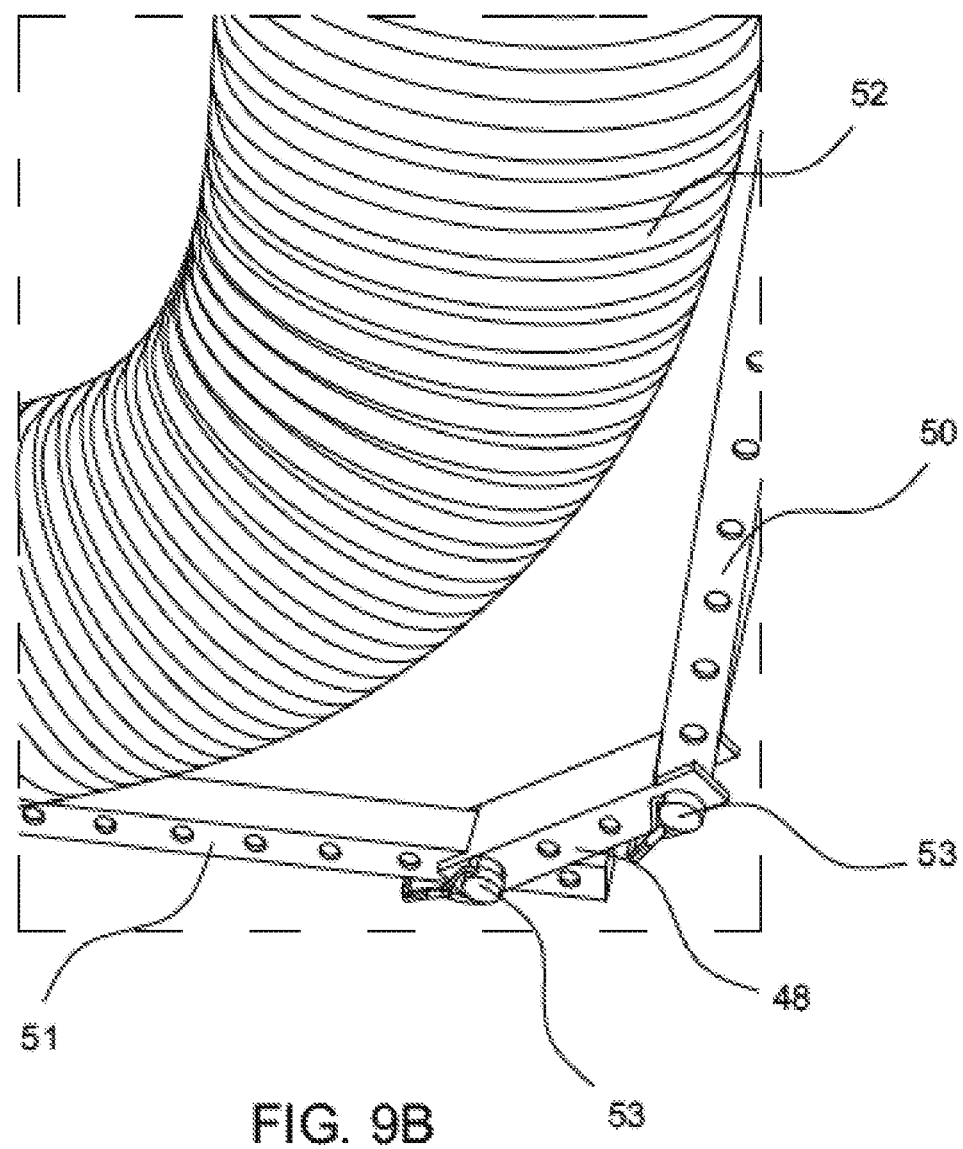
FIG. 9B is a view of the assembly bar short segment while employed in the invention, according to an embodiment of the present invention.

These bars are demonstrated throughout the exemplary figures of the invention. For instance, they are exhibited as Item (11) in FIG. 2. A short segment of the assembly bar are depicted in FIG. 9A and FIG. 9B. In particular, Item (48) of FIG. 9A depicts the body of a short segment of an assembly bar and Item (49) depict holes for snap pins to secure the short segment with other assembly bars. FIG. 9B depicts the use of an assembly bar short segment. In particular, Item (50) represents a distal long segment of an assembly bar, Item (51) represents a long segment of a proximal long segment of an assembly bar, Item (52) represents a vacuum hose tube, and item 53 represents a snap pin which secures these items together.

Preferably, the lengthwise bars have evenly spaced holes so that all the components can be pinned anywhere along the bar to meet the desires of the operator. In a preferred embodiment, these lengthwise bars are 1" solid aluminum square bar or aluminum round bar with holes 1½" apart on center the entire length of the bar.

Adaptor

Figure 3:
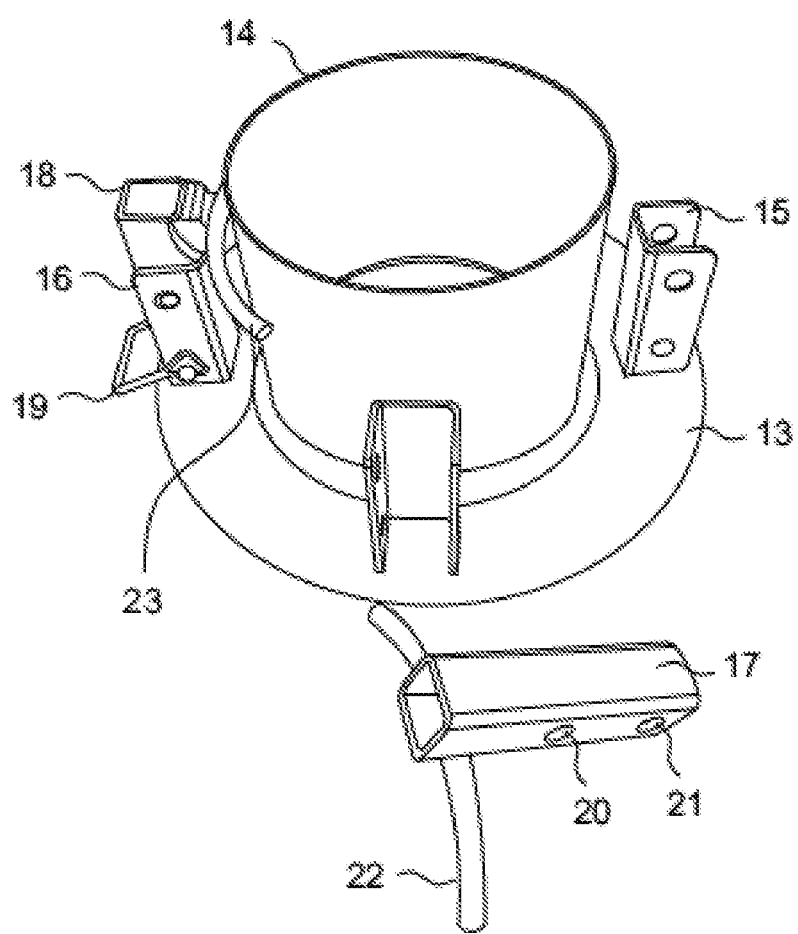
FIG. 3 is a view of the adaptor, according to an embodiment of the present invention.

Reference is made to FIG. 3, which is a view of the adaptor that connects the corrugated tubing from the vacuum truck with the rest of the primary attachment.

As depicted in FIG. 3, (13) is the base of the adaptor while (14) is the inner ring, which goes inside the corrugated pipe.

In a preferred embodiment, (13) is roughly 10½" in diameter.

In a preferred embodiment, (14) is approximately 5 13/16" in diameter and 4" in height to the adaptor base (13).

Further, items (15), (16), (17), and (18) are connection assemblies that secure in place the distal of end of the corrugated pipe (6), the adaptor (7), and the assembly bars (11).

Item (15) is a right securement assembly. Item (16) is a left securement assembly. Both (15) and (16) are secured to the adaptor base plate (13), but are secured 180' apart from one another. Both items (15) and (16) are approximately 3" high and have holes corresponding to the holes in the right securement structure (17) and the left securement structure (18), respectively.

As depicted in FIG. 3, item (17) depicts an unattached securement structure while (18) depicts securement structure attached to the left securement assembly (16). Item (19) depicts the left securement pin which is a metal pin that threads the holes to secure in place the full assembly.

In a preferred embodiment, both items (17) and (18) are each about 3" long and composed of 1" tube steel.

Although not depicted in FIG. 3, it should be understood that (18) would have the same dimensions as (17), but only differ in their depicted attachment to the adaptor.

Although not depicted in FIG. 3, it should be understood that while assembling the invention, the operator would connect item (17) with item (15) to fully secure the adaptor in place. Likewise, there would be a right securement pin, which corresponds to (19), to secure the adaptor in place.

Further, item (20) depicts a first hole in the right securement structure and item (21) depicts a second hole in the right securement structure. In a preferred embodiment, (20) and (21) are roughly 13/32" in diameter and spaced 1½" in apart on center.

Further, item (22) depicts a securement prong in the right securement structure while item (23) depicts a securement prong in the left securement structure. In a preferred embodiment, both item (22) and (23) are each about 5" in length and made from ¼" steel round bar.

While assembling the invention, the operator would connect item (17) with item (15) to fully secure the adaptor in place. Likewise, there would be a right securement pin, which corresponds to (19), to secure the adaptor in place.

Specifically, the operator would use items (17) and (18) to pin the adaptor in place with the corrugated pipe.

Figure 16:
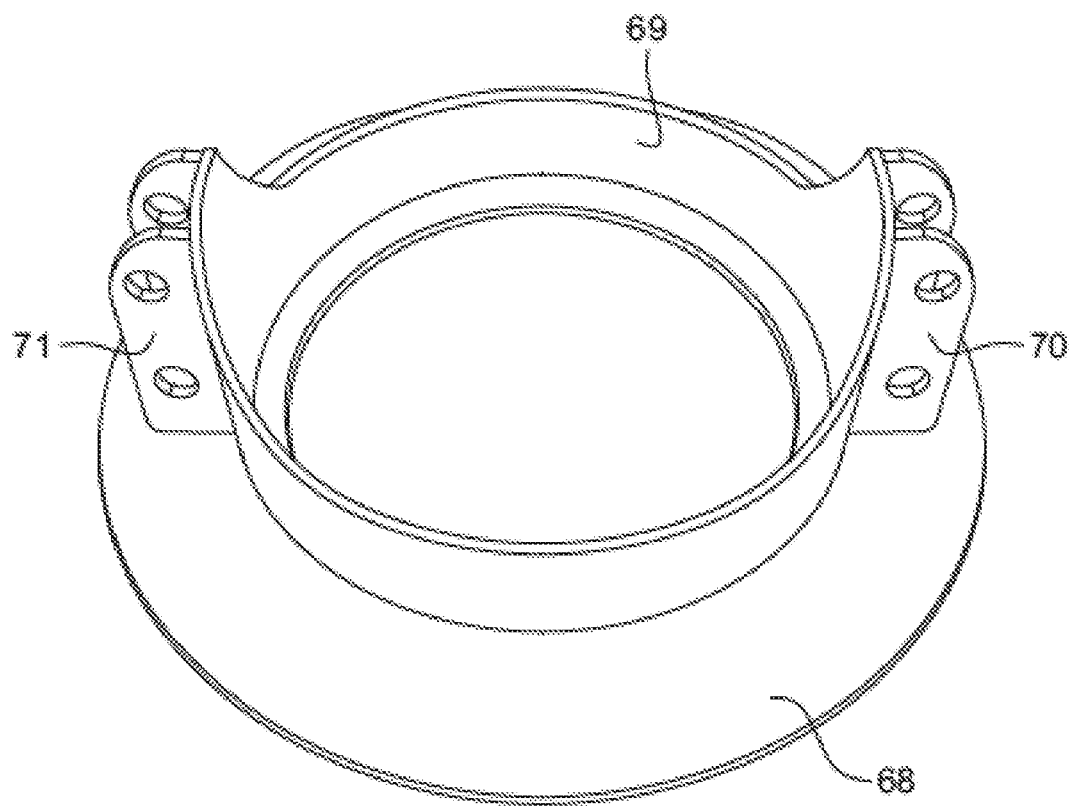
FIG. 16 is a view of the adaptor, according to an embodiment of the present invention.

Reference is made to FIG. 16, which is another embodiment of the adaptor.

As depicted in FIG. 16, (68) is the base of the adaptor while (69) Is an outer ring which goes on the outside of the corrugated pipe. This design reduces wear on the aluminum adapter itself.

In a preferred embodiment. (68) is roughly 10½' in diameter with the inner hole being roughly 6⅛" in diameter.

In a preferred embodiment, (69) is approximately 7" in diameter. It is approximately 3" in height at the connection points (71) and (70). It is approximately 1½" in height on the low sides.

Item (70) is a right securement. Item (71) is a left securement. Both (70) and (71) are secured to the outer ring (69), but are secured 180' apart from one another. Both items (70) and (71) are approximately 3" high and holes corresponding to the holes in the assembly bars (11).

Handles

Figure 4:
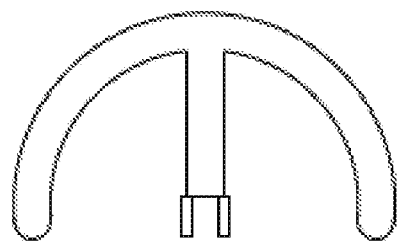
FIG. 4. is a view of the handles, according to an embodiment of the present invention.
Figure 4:
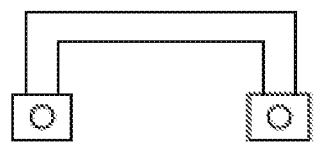
Figure 4:
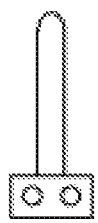
Figure 4:
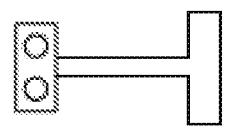
Figure 4:
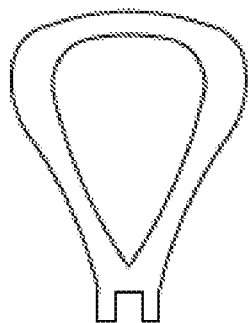
Figure 4:
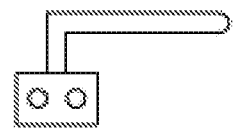

Reference is made to FIG. 4, which is a view of the various possible handles that one of skill in the art can use in the invention. One of skill in the art can select from a number of handles. Of central importance is the connection holes at the base of the handles, which allow securement to the extensor bars (11). In a preferred embodiment, the handles are made of steel.

Non-limiting examples of such handles are included in FIGS. 4A-4F.

FIG. 4A depicts a front view of a rounded handle.
FIG. 4B depicts a side view of rounded handle.
FIG. 4C depicts a front view of a triangular handle.
FIG. 4D depicts a side view of a rectangular handle.
FIG. 4E depicts a side view of a T-handle.
FIG. 4F depicts a side view of an L-handle.

Shutter Relief Valve

Figure 5A:
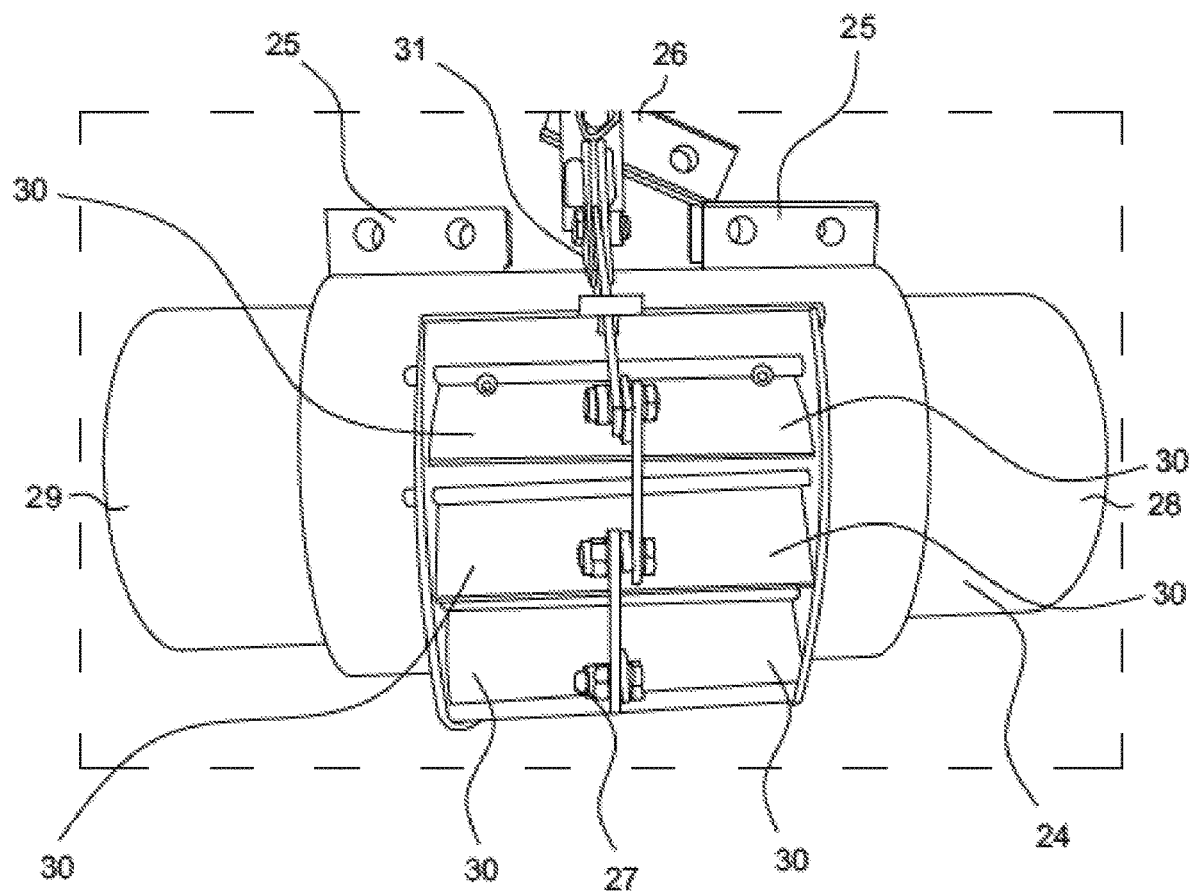
FIG. 5A is a lateral view of the shutter relief valve, according to an embodiment of the present invention.

FIG. 5A is a lateral view of the shutter relief valve, according to an embodiment of the present invention.

Figure 5B:
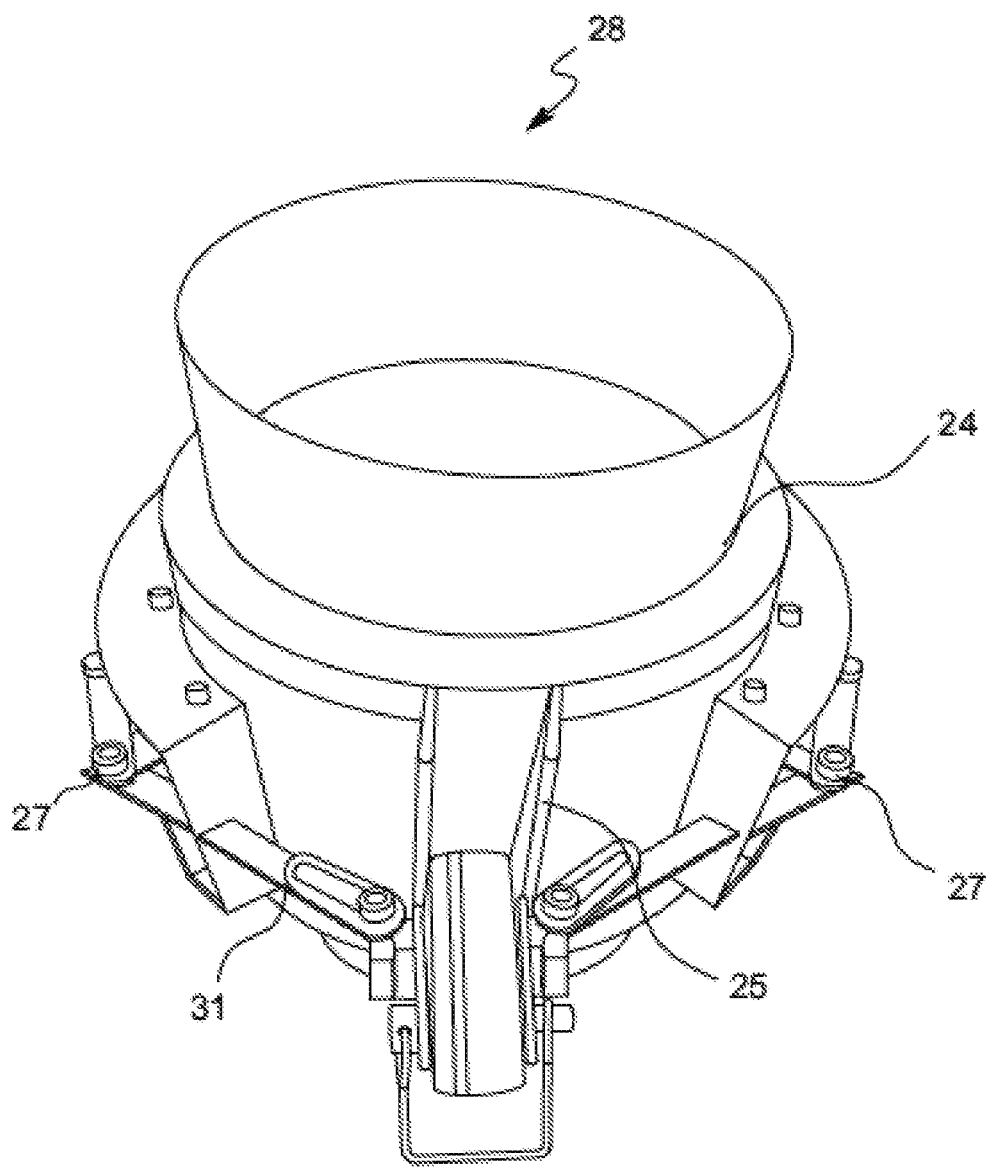
FIG. 5B is a vertical-diagonal view of the shutter relief valve, according to an embodiment of the present invention

FIG. 5B is a vertical-diagonal view of the shutter relief valve, according to an embodiment of the present invention The shutter relief valve is used in reduction, distribution, and conveying vacuum pressure during the operation of the invention. In particular, it diverts vacuum pressure from the vacuum tip through the shutters when the shutters are open.

As shown in FIG. 5A and FIG. 5B, Item (30) depicts shutters that extend along the longitudinal axis of the shutter relief valve. In a preferred embodiment, the shutters are about 5-6" long and 1 to 1½" wide. These are opened and closed to optimize air intake to divert vacuum pressure from the vacuum tip (12) of FIG. 2 through the shutters using the linkage, depicted as Item (27). Specifically, item (27) is a linkage that pins together both sides of the shutter relief to close the valve. Item 31 is a shutter linkage arm which connects these together. During operation, the operator can push (26) inward to open the shutter valve or pull (26) out to close the shutter valve.

Item (24) depicts the body of the shutter relief valve.

Item (25) depicts the Shutter Relief Valve attachment structures that enable connection between the shutter relief valve to the assembly bars (11). In a preferred embodiment, Item (25) contains holes that match the assembly bars, which allows securement with two snap pins.

Item (26) depicts a removable section of securement structure.

Item (28) depicts the distal end of the shutter relief valve while Item (29) depicts the proximal end of the shutter relief valve. Both Items (28) and (29) go on the outside of the corrugated pipe or tubing. In a preferred embodiment, at the ends of the shutter relief valve (28) and (29), the diameter of the shutter relief valve (24) is the same diameter as the inside of the pipe or tubing.

In a preferred embodiment, the diameter of the body of the shutter relief valve (24) is slightly bigger than the outside diameter of the corrugated pipe or tubing.

In a preferred embodiment, the overall length of the body of the shutter relief valve (24) is 9-12 inches long.

In a preferred embodiment, the shutter relief valve has two sets up shutters.

These can opened to redirect vacuum air flow.

In a preferred embodiment, the shutter relief valve is made of steel or aluminum.

Figure 18:
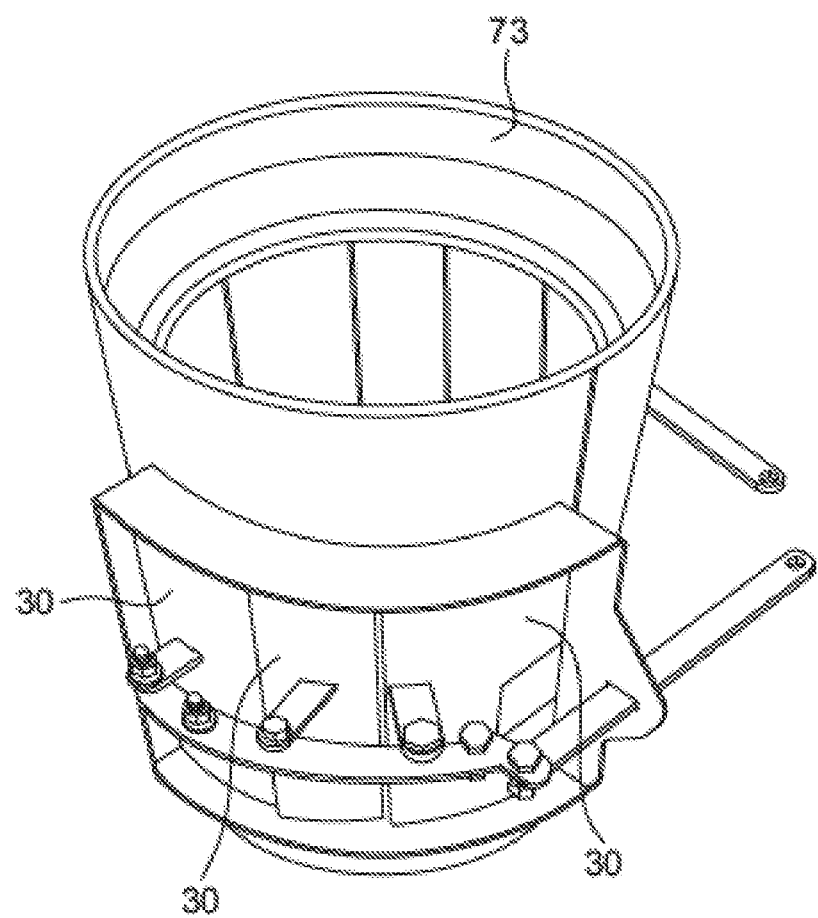
FIG. 18 is a view of the shutter relief valve, according to an embodiment of the present invention.

Reference is made to FIG. 18, which shows another embodiment of the shutter relief valve. Item (30) depicts shutters that extend along the longitudinal axis of the shutter relief valve.

Clamp

FIG. 6 is a view of the clamp, according to the invention.

As used herein, the clamp has several purposes. First, it attaches to the hose to separate pieces of tubing together or to connect to the tubing to hook a bar to the clamp. This seals the hose when connecting two tubes together. Second, it enables it to be used as a handle to manipulate the end of the tubing for digging. Third, it can also be used to hook to the bar using two clamps to keep the tubing from flexing under vacuum. The clamp is not intended to be too tight that it either prevents backflow or obstructs the flow of materials through the tubing.

As shown in FIG. 6, Item (32) is the outer clamp ring. Item (33) is the connection for the bar hooks to clamp. Item (34) is the snap pin. Item (35) is the catch pull down latch or an adjustable toggle clamp latch.

In a preferred embodiment, the outer clamp ring is 3" in width.

In a preferred embodiment, the connection for the bar hooks are 3" long and are spaced 1½ inches apart on center.

In a preferred embodiment, the snap pin is ⅜" in diameter and is 1¼" long.

In a preferred embodiment, the clamp can be made of steel or aluminum.

Further, where 8" corrugated tube or pipe is used for the invention, these measurements would remain the same.

Figure 19:
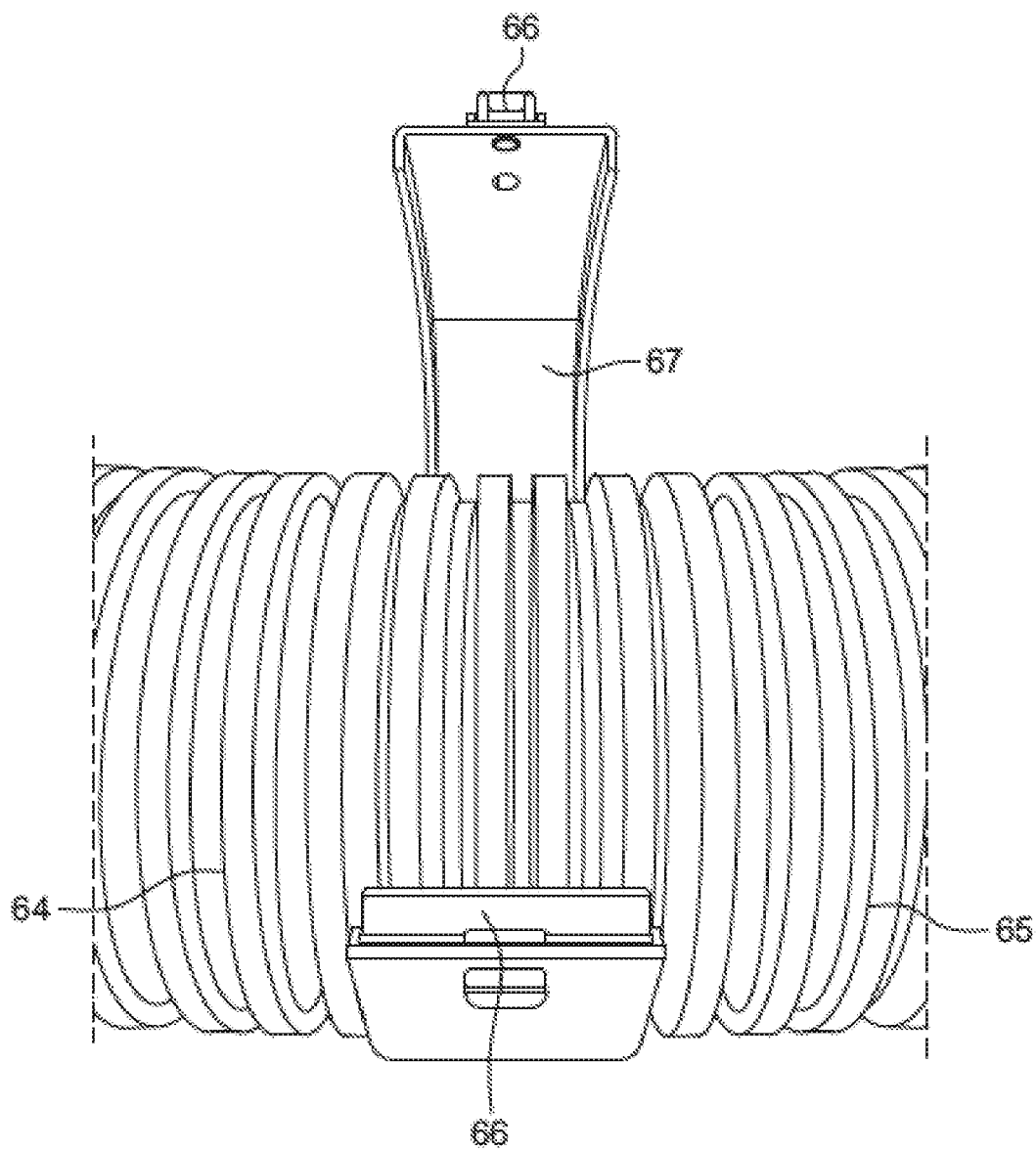
FIG. 19 is a view of the clamp ring system, according to an embodiment of the present invention

Reference is made to FIG. 19, which shows another embodiment for the clamp ring system. In this embodiment, a metal tab (66) is added to the latch end of the outer clamp ring (67) to help the latch end to seal when attaching two sections of corrugated tubing or pipe together (64) and (65), and to add strength when sideloading the clamp.

In a preferred embodiment, the outer clamp ring is 3" to 3¼" in width. In a preferred embodiment, the connection for the assembly bar hooks are 3" long and the holes for the snap pins are 1½" apart on center to correspond to the holes on the assembly bars.

Vacuum Tip

Figure 7:
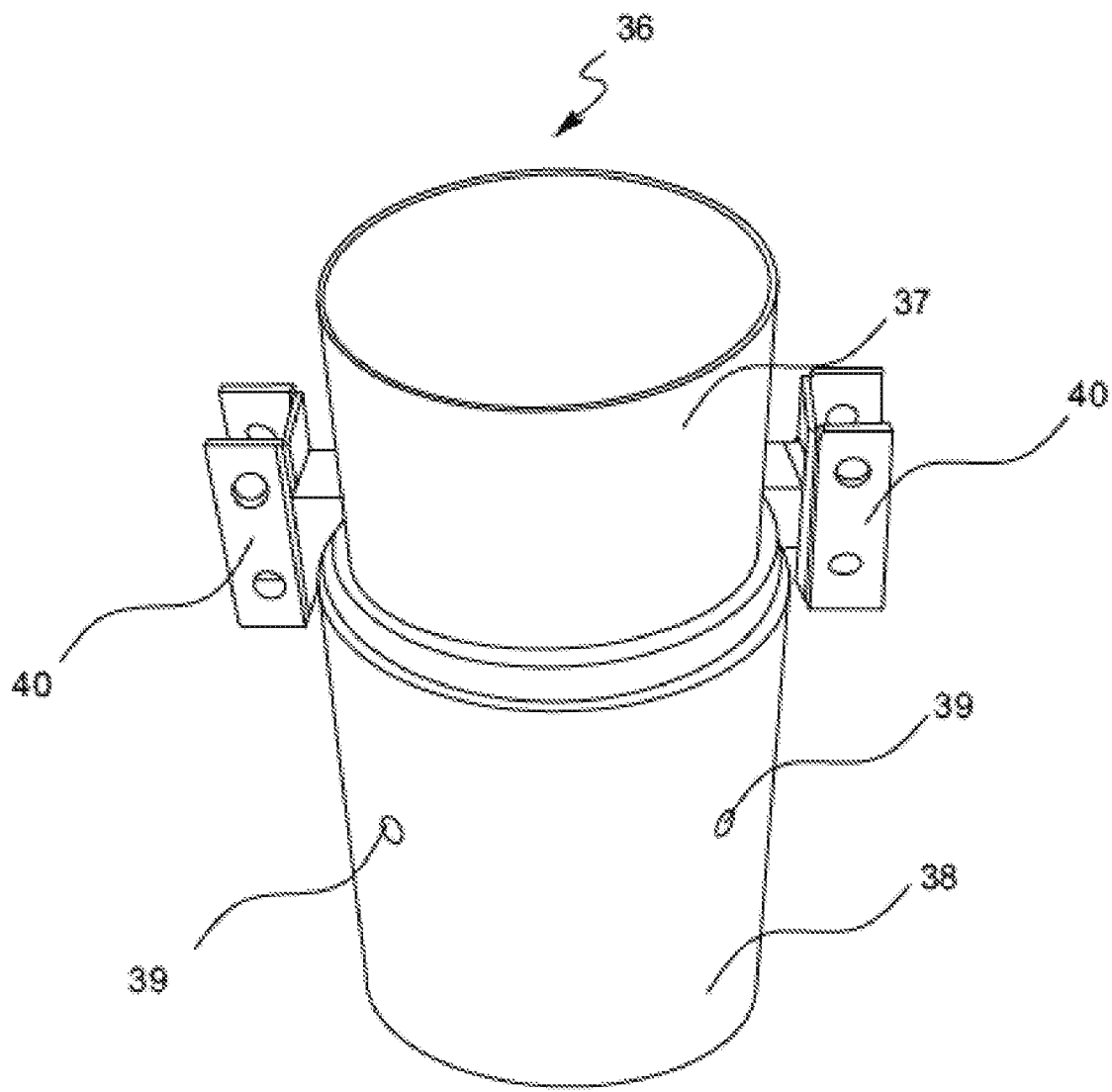
FIG. 7 is a view of the vacuum tip, according to an embodiment of the present invention.

FIG. 7 is a view of the vacuum tip, according to an embodiment of the present invention.

The vacuum tip allows for a softer digging and excavation without damaging utility lines or other underground objects that must be protected. Such utility lines include, but is not limited to, sewer pipes, telephone lines, electric lines, internet lines, fiber-optic cables, and the like. Item (36) represents the proximal end of the vacuum tip.

The vacuum tip is composed of a vacuum tip core (Item (37)) and a vacuum tip cover (Item (38).

The vacuum tip core is made of any durable utility metal, but in a preferred embodiment, it is made of steel or aluminum.

The vacuum tip cover is a durable but replaceable unit to prevent the damage to underground objects. The vacuum tip cover is attached to the vacuum tip core by a series of bolts (Item (39). In a preferred embodiment, there are four bolts, spaced evenly around the circumference of the vacuum tip cover.

During the course of digging or excavation, abrasive hard materials such as dirt, sand, and stone are vacuumed into the remote hydro excavation system. Over time, these materials will wear against the vacuum tip cover and it needs to be replaced. For that reason, it is preferred that the vacuum tip cover be made of a firm, but slightly flexible material, such as rubber or plastic.

In a preferred embodiment, the vacuum tip has no holes for water nozzles.

In a preferred embodiment, the vacuum tip core is approximately 4-5 inches from the top lip to the middle lip and approximately 3-4 inches from the bottom lip to the middle lip.

Item (40) depicts connections for the bar hooks to the vacuum tip core.

Figure 17:
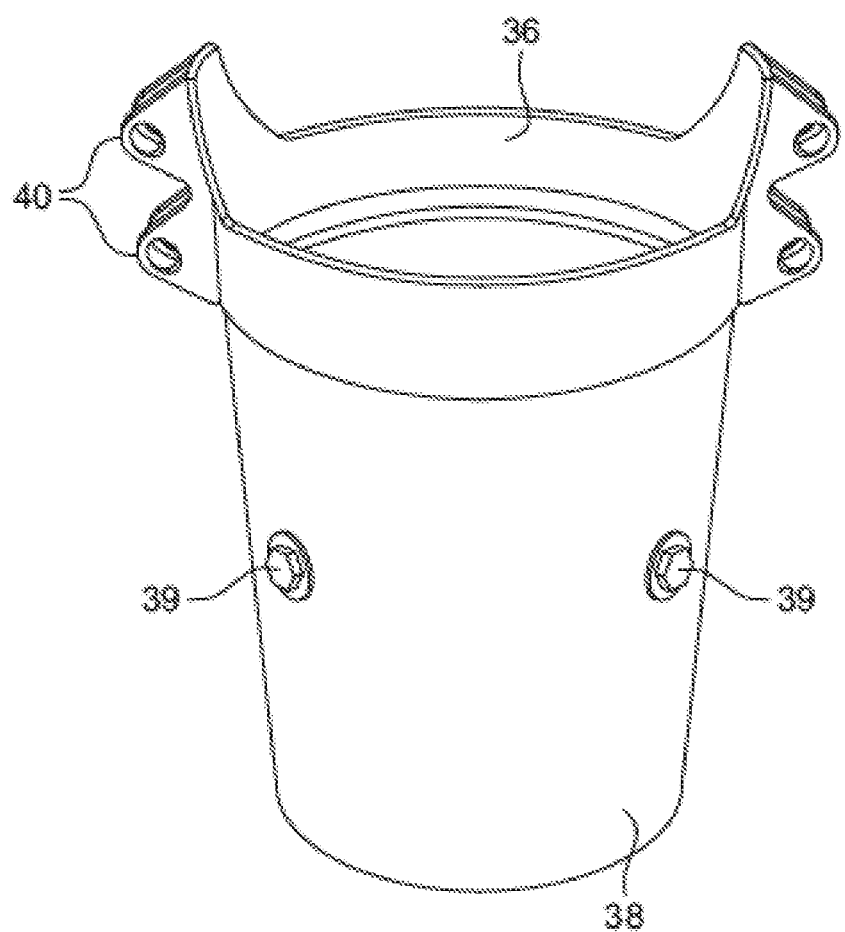
FIG. 17 is a view of the vacuum tip core, according to an embodiment of the present invention.

Reference is made to FIG. 17, which depicts another embodiment of the vacuum tip core. The vacuum tip is composed of a vacuum tip core, Item (36), which goes around the outside of the corrugated pipe or tubing and a vacuum tip cover, Item (38). Item (40) depicts connections for the assembly bars to the vacuum tip core (36).

Secondary Attachment (Debris Box)

Figure 8:
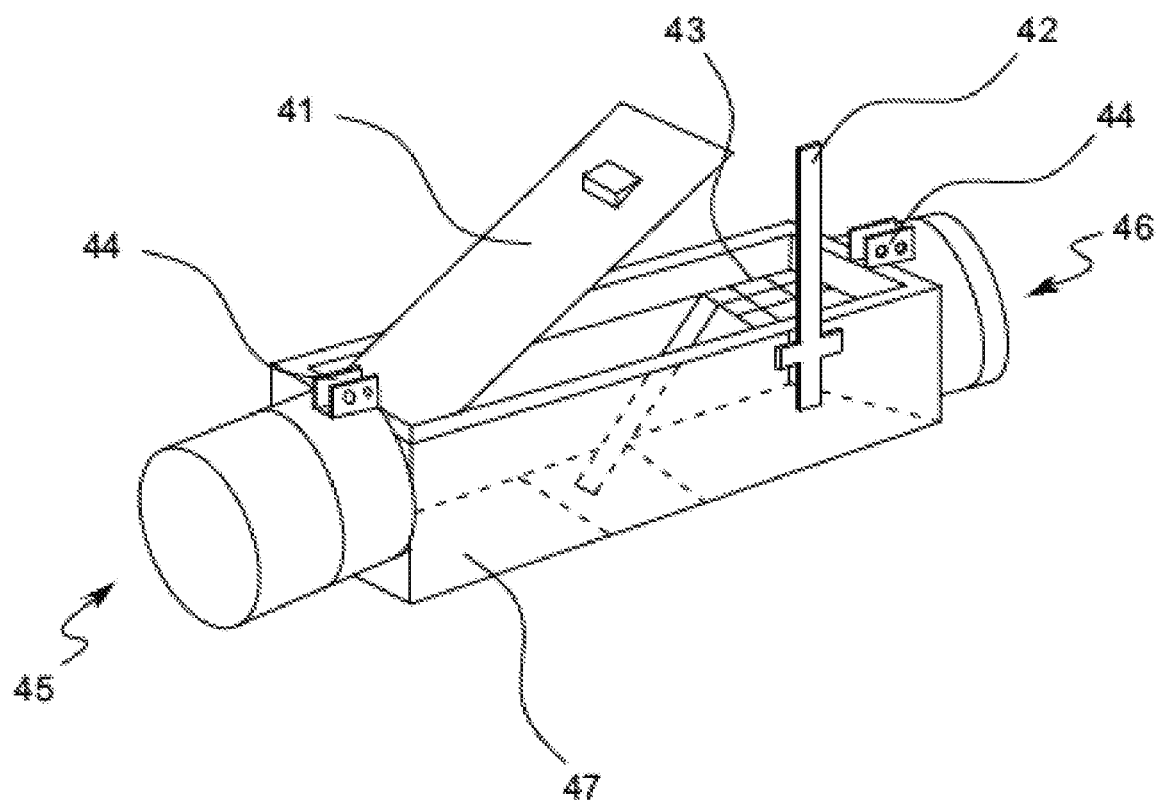
FIG. 8 is a view of the secondary attachment, a debris box, according to an embodiment of the present invention.

FIG. 8 is a view of the debris box, according to an embodiment of the present invention.

The debris box is a rectangular box with cylindrical attachments at the longitudinal ends to attach to the corrugated tube.

As depicted in FIG. 8, item (41) is a debris box door. Item (42) is a safety handle that can open the debris door by pushing it forward or backward to open the door to relieve vacuum pressure and is used to remove debris that is too big to fit through the tubing. Item (43) is a grate or bar to prevent to large of debris from going further than the box and potentially clogging the tubing. This grate can be adjusted depending on size of debris. Item (44) represents connection for bar hooks to the debris box. Item (45) is the distal end of the debris box. Item (45) is the debris box body. Item (46) is the proximal end of the debris box.

Generally, the box prevents debris larger than 5" from entering through the corrugated tubing. With vacuumed ore, debris enters from the distal end of the debris box (47). Item (43) prevents larger debris from exiting the debris box through its proximal end (46).

In a preferred embodiment, the debris box door (41) is roughly 12-15" long.

In a preferred embodiment, the debris box is made of steel or aluminum.

Tube Junction Adaptor

Figure 10:
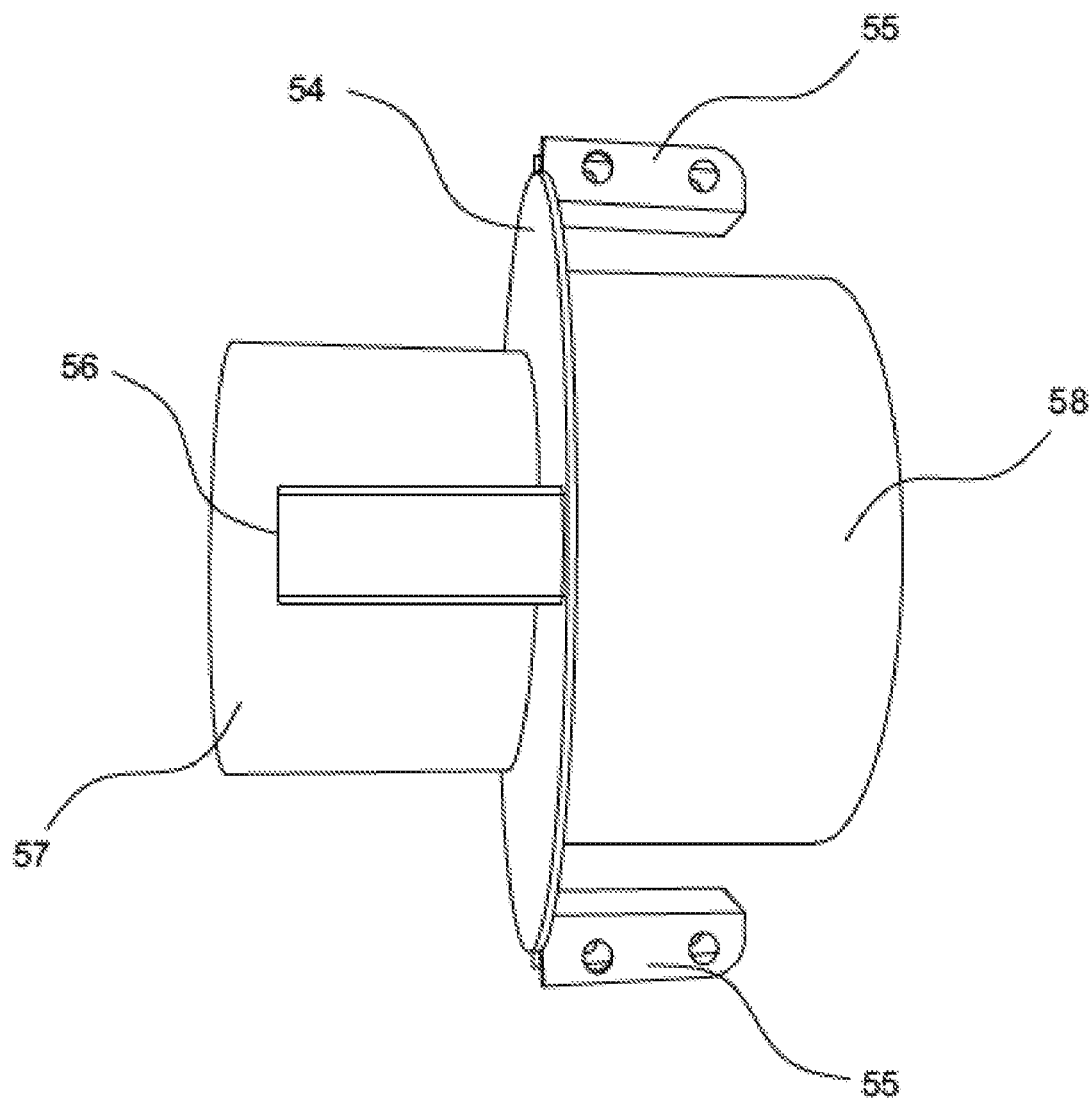
FIG. 10 is a view of the tube junction adaptor, according to an embodiment of the present invention.
Figure 11:
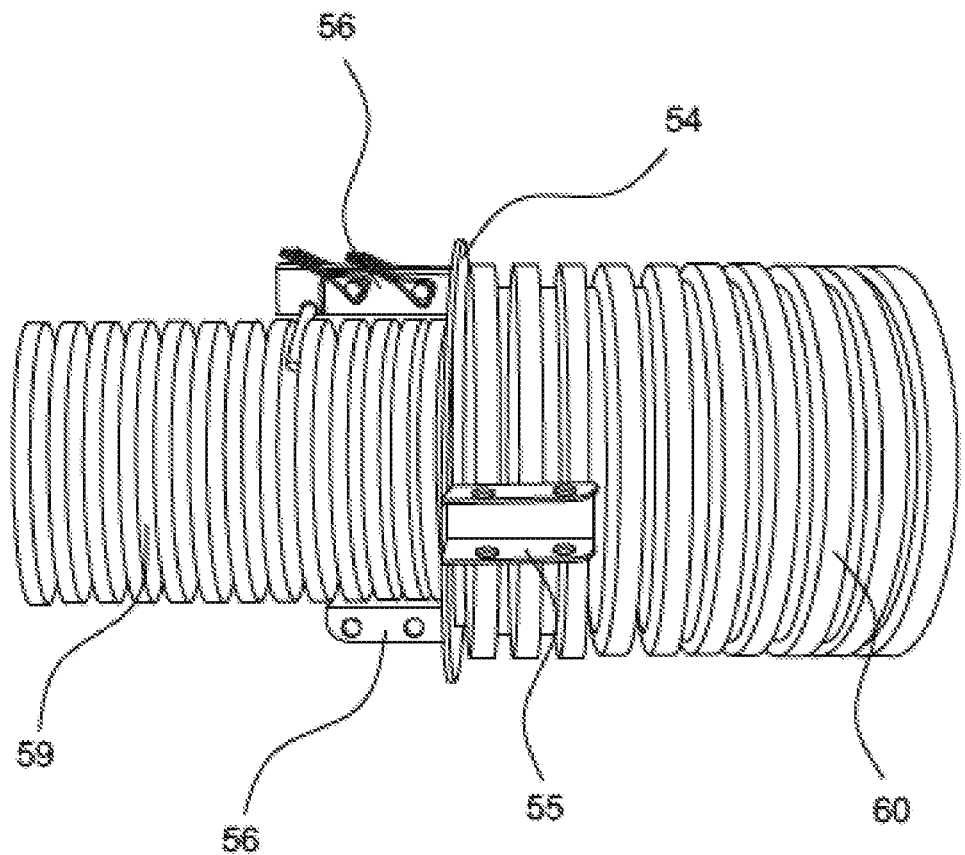
FIG. 11 is a view of the tube junction adaptor while employed in the invention, according to an embodiment of the present invention.

FIG. 10 is a view of the tube junction adaptor, according to an embodiment of the present invention. FIG. 11 depicts the tube junction adaptor as employed in the invention.

The purpose of the tube junction adaptor is to secure together corrugated vacuum hose tubing of different sizes.

The tube junction adaptor is composed of an adaptor plate (54), a securement assembly of the junction adaptor for a large tube (55), a securement assembly of the junction adaptor for a small tube (56), a small articulating cylinder (57), and a large articulating cylinder (58).

It should be understood that Item (56) in FIG. 11 also shows Item (17) from FIG. 3 with snap pins.

As the junction adaptor is employed, Item (59) represents a smaller vacuum tube and Item (60) represents a larger vacuum tube.

Other Securements

Figure 12:
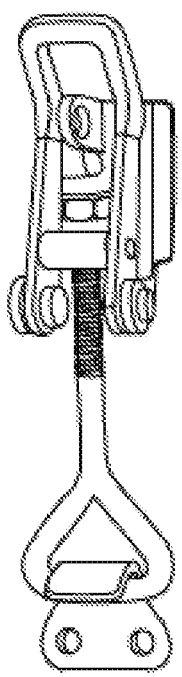
FIG. 12 is a view of an adjustable latch, according to an embodiment of the present invention.

FIG. 12 is a view of a commercially available adjustable latch which can be used to secure the pieces of the primary attachment.

Figure 13:
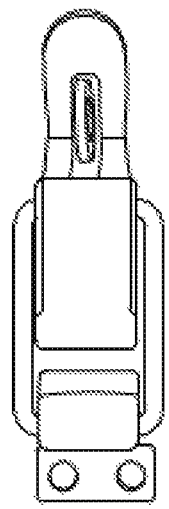
FIG. 13 is a view of a fixed latch, according to an embodiment of the present invention.

FIG. 13 is a view of a commercially available fixed latch which can be used to secure the pieces of the primary attachment.

Figure 14:
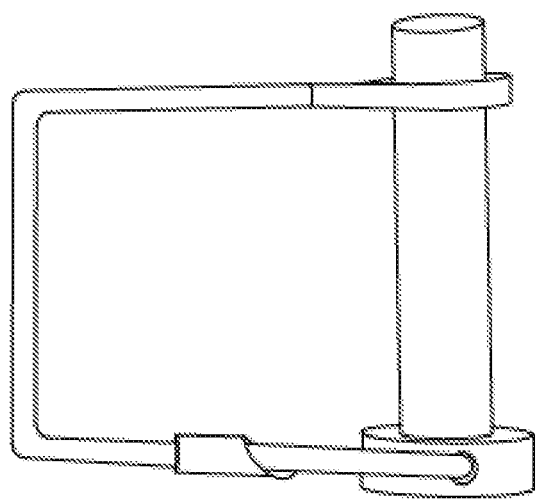
FIG. 14 is a view of a snap pin, according to an embodiment of the present invention.

FIG. 14 is a view of a commercially available snap pin which can be used to secure the pieces of the primary attachment.

Figure 15:
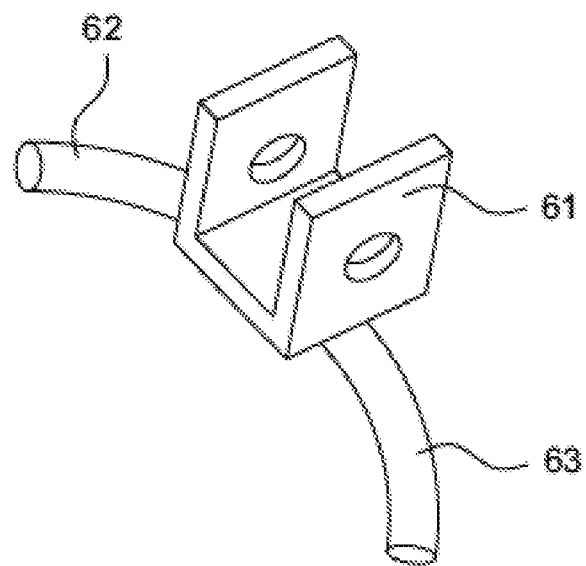
FIG. 15 is a view of a securement structure, according to an embodiment of the present invention.

FIG. 15 is a view of a securement structure which can be used to secure the pieces of the primary attachment. As depicted, Item (61) represents the securement assembly of the securement structure, Item (62) represents the right securement prong of the securement structure, and Item (63) represents the left securement prong of the securement structure.

Figure 20:
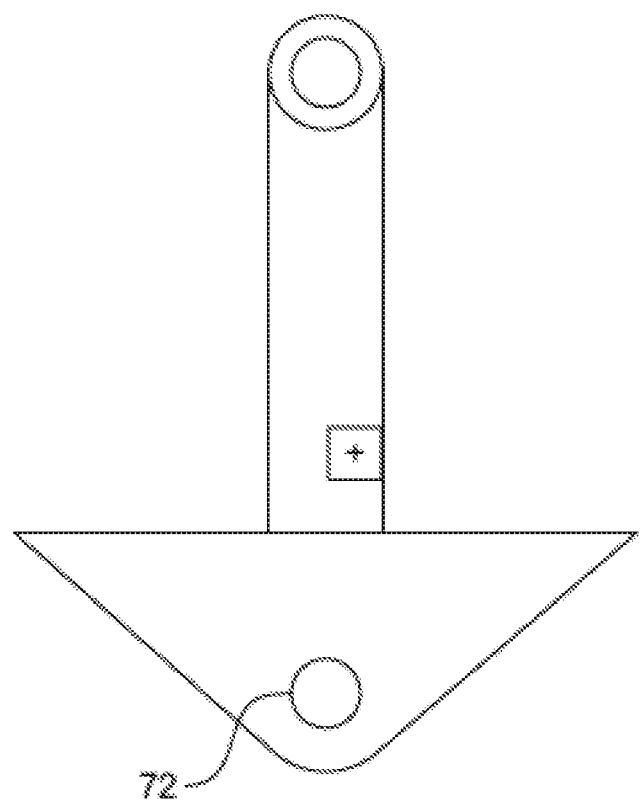
FIG. 20 is a side view of a tee handle, according to an embodiment of the present invention.

FIG. 20 is a side view of a tee handle which can be secured to a assembly bar (11) using Item (72), which is a pin hole.

I claim:

1. A method of vacuuming fluids into a vacuum truck using the following steps: Articulating said vacuum tip to the distal end of a first segment of vacuum tube; Connecting said vacuum tip to said assembly bar; Articulating said clamp to the proximal end of said first segment of vacuum tube and to the distal end of second segment of vacuum tube; Connecting said clamp to said assembly bar; Articulating said shutter relief valve to the proximal end of said second segment of vacuum tube; Connecting said shutter relief value to said assembly bar; Connecting at least one handle to said assembly bar; Attaching an adaptor to the proximal end of said second segment of vacuum tube; and, Connecting said adaptor to the distal portion of a vacuum hose that is attached to a vacuum truck.

2. An apparatus for for vacuuming fluids into a vacuum truck utilizing a primary attachment at the distal end of a vacuum truck hose, consisting of a. At least one handle that connects to at least one assembly bar and can be transposed along said assembly bar and reattached to said assembly bar; b. a shutter relief valve that connects to said assembly bar; c. a clamp that connects to said assembly bar and can be transposed along said assembly bar and reattached to said assembly bar; d. at least one assembly bar; and, e. a vacuum tip that connects to said assembly bar and utilizing using the Method of claim 1.

3. The vacuum tip of claim 2 wherein it lacks water nozzle holes.

4. The assembly bar of claim 2, wherein it connects said removable handle, said shutter relief valve, said clamp and said vacuum tip.

5. The shutter relief valve of claim 2, wherein it has at least one shutter.

6. The shutter relief valve of claim 5, wherein it has two shutters.

7. The handle of claim 2, wherein the handle is removable.

8. An apparatus for vacuuming fluids into a vacuum truck comprising: At least one assembly bar; At least one section of vacuum tubing further comprising a distal end, a proximal end, and a central section; A dig tip which is slid around the distal end of said vacuum tubing and is connected to an assembly bar with at least one snap pin; A relief valve which is slid around the proximal end of said vacuum tubing and at attached to said assembly bar with at least one snap pin; At least one assembly clamp that surrounds the central section of said vacuum tubing and is attached to said assembly bar with at least one snap pin; At least one assembly adaptor that connects to said assembly bar with at least one snap pin; and An assembly adaptor that is slid around the proximal end of said vacuum tubing and is connected to an assembly bar with at least one snap pin, and utilizing using the Method of claim 1.

* * * * *